Oct. 17, 1939.  C. C. FUERST  2,176,493
SHUTTER-OPERATING MECHANISM FOR A FOLDING CAMERA
Filed June 23, 1937

Carl C. Fuerst
INVENTOR

BY Newton M. Perrins
George A. Gillette, Jr.
ATTORNEYS

Patented Oct. 17, 1939

2,176,493

UNITED STATES PATENT OFFICE 2,176,493

SHUTTER-OPERATING MECHANISM FOR A FOLDING CAMERA

Carl C. Fuerst, Rochester, N. Y., assignor to Eastman Kodak Company, Rochester, N. Y., a corporation of New Jersey Application June 23, 1937, Serial No. 149,877

4 Claims. (Cl. 95—60)

The present invention relates to a shutter operating mechanism for a folding camera and more particularly to a mechanism including an actuating member movably mounted upon the operative connections or links connected between the camera body and the front panel of the camera.

Small folding cameras with the shutter operating arm on an extensible front panel are open to the objection of camera movement upon operation of the shutter either because of the awkwardness in operating the shutter or because it is difficult to operate the shutter without also moving the front panel of the camera.

The primary object of the present invention is the provision of a shutter actuating mechanism operated from the camera body or from a point adjacent the camera body and including an actuating member movably mounted upon the pivoted connections or braces between the front panel and the camera body. Another object of the invention is the arrangement of such an actuating member so that when the camera is folded said actuating member is inoperative. Another object of the invention is arrangement of the actuating member with respect to a finger member fulcrumed on the camera body so that when the camera is closed said actuating member is moved so that its point of contact is at or adjacent the fulcrum for the finger member to render the same inoperative. Other and further objects of the invention will be suggested to those skilled in the art by the following description.

The above and other objects of the invention are attained in a folding camera comprising a camera body, a front panel including a shutter assembly having an operating arm, and operative connections between the camera body and panel by the arrangement of an actuating member movably mounted upon one of said operative connections and for actuating the operating arm of the shutter assembly. Such arrangement may also include a finger member fulcrumed on the camera body and for operating said actuating member.

Reference is hereby made to the accompanying drawing wherein similar reference characters designate similar elements and wherein.

Figure 1:
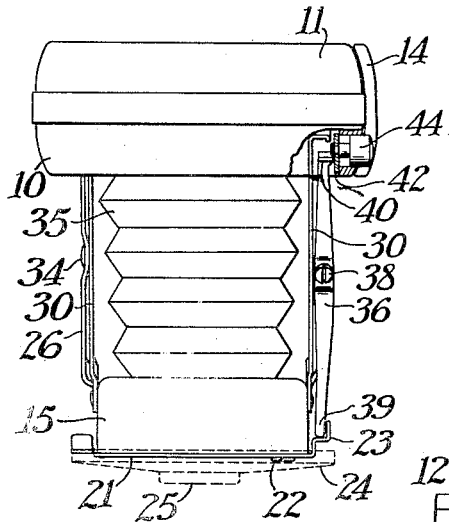
Fig. 1 is a plan view of a folding camera equipped with a shutter actuating mechanism according to the invention.

The shutter actuating mechanism according to the invention is applied to the folding camera of any type but for purposes of illustration is shown as being mounted on a folding camera comprising a camera body, a front panel including a shutter assembly, and operative connections between said panel and said camera body.

The camera body is composed of a front body member 10, a cover member 11 and a latch connection 12 for fastening said members 10 and 11 together. The front body member 10 is provided with a recess 13 for receiving the foldable parts of the camera and also carries a foldable finder 14.

The front panel comprises a casing 15 within which the shutter assembly is mounted. Said shutter assembly includes a shutter disc 16 pivotally mounted by a stud 17 on casing 15, a cover blade 18 also pivotally mounted on casing 15 by a stud 19 and a spring member 20 which is connected between cover blade 18 and shutter disc 16. The shutter assembly also includes an operating arm 21 which is a Y-shaped member pivotally mounted by a bolt 22 on casing 15, having one arm connected to cover blade 18 and having a projection 23 overhanging one side of the casing 15. Rotation of the operating arm 21 in a counter-clockwise direction causes rotation of cover blade 18 and operation of shutter disc 16 in a manner well known in the art for the exposure of photographic materials. Said front panel may also be enclosed by a cover plate 24 indicated by the dotted lines in Fig. 4 and carrying a photographic objective 25.

Figure 4:
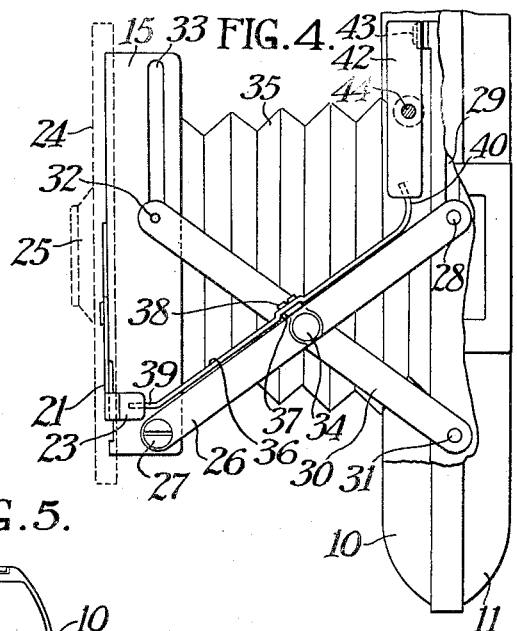
Fig. 4 is a side elevation of a folding camera equipped with the improved shutter mechanism and with the camera in open position.

The front panel may be operatively connected to the camera body by any of a large variety of recognized operative connections. One form of such operative connections is disclosed herein and may comprise a plurality of braces preferably provided in pairs on opposite sides of the camera. The brace 26, see Fig. 4, is pivoted at its forward end to the casing 15 by a stud 27 and is slidably connected to the camera body at its rear end by a pin 28 which slides within a slot 29 provided in the side wall of front camera body 10. A second brace 30 is pivotally connected at its rear end to the camera body member 10 by a pivot 31 and is slidably connected at its forward end to the front panel by a pin 32 engaging a slot 33 in casing 15. Braces 26 and 30 may be intermediately pivoted to each other by a stud 34. A second pair of braces 26 and 30 are provided in the same manner to connect the opposite side of casing 15 to the opposite side of the front body member 10. A bellows 35 is connected between the front panel or casing 15 and the front body member 10 of the camera.

Figures 2, 5:
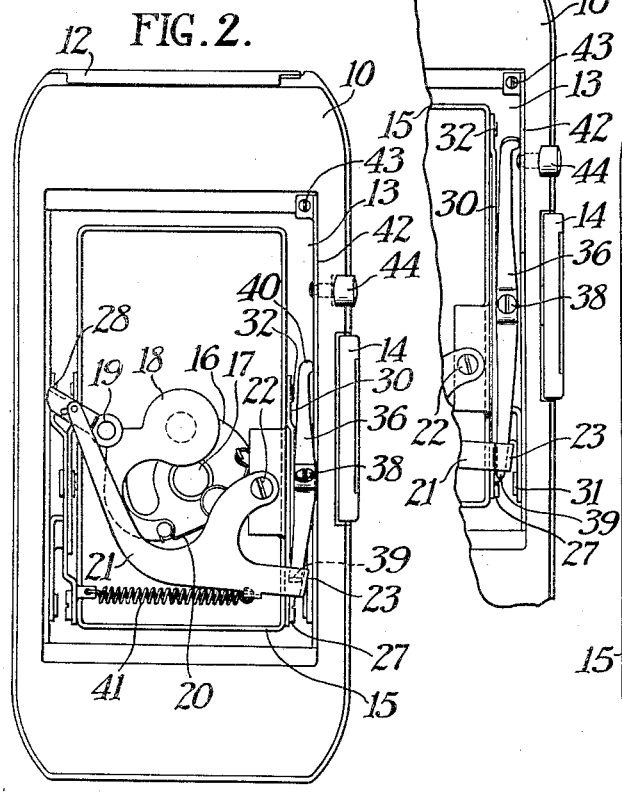
Fig. 2 is a front view of a folding camera equipped with my improved shutter actuating mechanism and with the front panel in open position.
Fig. 5 is a fragmentary front elevation of a folding camera in closed position and equipped with the shutter actuating mechanism of the invention.

The camera features thus far described are well known and those skilled in the art will recognize that the front panel of the folding camera illustrated is movable to an open or extended position, such as illustrated in Figs. 1 and 4 and in which position the camera may be used for picture taking and that the front panel is movable to a folded or collapsed position, such as is illustrated in Fig. 5 and which position renders the camera more compact for transportation.

The novel features of the invention will next be described and include an actuating member pivotally mounted upon the operative connections between the camera body and front panel and a finger member fulcrumed upon the camera body. The actuating member or lever member 36 is movably mounted upon the operative connections between the front panel and camera body. Such movable mounting preferably comprises a tongue 37 connected to the brace 26 and into which a headed screw 38 is threaded. Thus tongue 37 and screw 38 provide an intermediate pivotal mounting for lever member 36. One end 39 of lever member 36 lies underneath or inside of projection 23 of operating arm 21. The other end 40 of lever member 36 extends into the recess 13 of the front body member 10. A coil spring 41 is connected between shutter operating arm 21 and one side of casing 15 and normally maintains said operating arm 21 and cover blade 18, spring 20 and shutter disc 16 in the positions shown in Fig. 2. Operation of lever member 36 will cause counter-clockwise operation of arm 21 as illustrated in Fig. 3 and operation of the shutter assembly.

A finger member for operating the actuating member or lever member 36 is mounted upon the camera body. Such a finger member may comprise an arm 42 fulcrumed by a screw 43 within the recess 13 of front body member 10 and carrying a finger button 44 which extends through the side wall of front body member 10.

Figure 3:
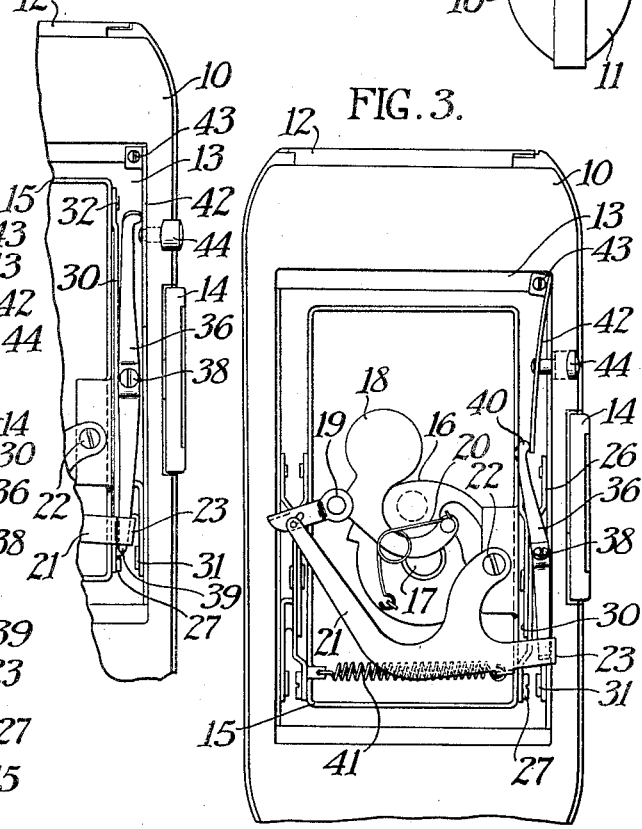
Fig. 3 is similar to Fig. 2 but illustrates the change in relative positions of the members for actuation of the shutter.

When the front panel of the folding camera is in open position, depressing finger button 44 moves arm 42 about its fulcrum, see Fig. 3, and the inner end 40 of lever member 36 will be moved in a counter-clockwise direction for operation of the shutter elements and exposure of a picture. Upon release of finger button 44 coil spring 41 will return the shutter elements, operating arm 21, lever member 36, arm 42 and finger button 44 to the positions shown in Figs. 1 and 2.

When the front panel of the camera is folded or collapsed, the braces 26 and 30 are pivoted with respect to each other until the brace 30 becomes substantially parallel with the brace 26 and in which position the brace 30 is adjacent the lever member 36. In this closed position of the front panel and braces 26 and 30 the lever member 36 cannot be rotated about the screw 38 and the finger member including arm 42 and finger button 44 is also blocked in extended position, see Fig. 5, so that depression of finger button 44 cannot function to cause operation of operating arm 21 or the other shutter elements. In addition, the shutter operating mechanism is also rendered inoperative by a change in the relative positions between the end 40 of lever 36 and the fulcrum for arm 42. When the camera is in open position the end 40 of lever 36 is considerably displaced from the fulcrum for arm 42 so that said arm 42 acts with maximum mechanical effort upon lever 36. When the front panel is folded or moved to closed position the end 40 of lever 36 moves toward the fulcrum of arm 42 and so nearly approaches the fulcrum that the mechanical effort in operation of arm 42 is materially reduced or practically eliminated. Therefore, again the finger member is rendered inoperative when the front panel is moved to closed or folded position.

Since the shutter operating mechanism of the present invention is susceptible of many variations, the present disclosure is to be construed in an illustrative sense and the scope of the invention is defined by the claims which follow.

Having now particularly described my invention what I desire to secure by Letters Patent of the United States and what I claim is:

1. In a photographic camera, the combination with a camera body, a front panel including a shutter assembly having an operating arm, and operative connections between said camera body and said panel for supporting said panel in open position, for guiding said panel during its movements to and from said open position, and moving during such guiding in a plane parallel to the path of said panel, of a supporting member on one of said connections and including a pivotal mount with its axis substantially parallel to the plane of movement of said connections, and an actuating member rotatably supported by said pivotal mount for movement transversely of the plane of movement of said connections to actuate the operating arm of said shutter assembly.

2. In a photographic camera, the combination with a camera body, a front panel including a shutter assembly having an operating arm, and a plurality of braces operatively connected between said camera body and said panel, supporting said panel in open position, guiding said panel during its movements between said open position and a closed position, and movable in a plane parallel to the path of said panel, of a supporting lug on and at an angle to one of said braces and carrying a pivot, and an actuating member rotatably mounted on said lug by said pivot, movable in open position of said panel transversely of the plane of movement of said braces to actuate the arm of said shutter assembly, and adapted, upon closing of said panel, to be moved into blocking relation with respect to one of said braces and rendered inoperative thereby.

3. In a photographic camera, the combination with a camera body, a front panel including a shutter assembly having an operating arm, and a pair of braces intermediately pivoted and operatively connected between said camera body and said panel, supporting said panel in open position, guiding said panel during its movements between said open position and a closed position, and movable in a plane parallel to the path of said panel, of a supporting lug on and at an angle to one of said braces and carrying a pivot, and an actuating member rotatably mounted on said lug by said pivot, movable in open position of said panel transversely of the plane of movement of said braces to actuate the arm of said shutter assembly, and adapted, upon closing of said panel, to be moved into blocking relation with respect to the other of said braces and rendered inoperative thereby.

4. In a photographic camera, the combination with a camera body, a front panel including a shutter assembly having an operating arm, and operative connections between said camera body and said panel for guiding said panel into closed and open positions with respect to said camera body, of a finger member pivotally mounted on said camera body for movement about a fulcrum, a supporting lug on and at an angle to one of said connections and carrying a pivot, and an actuating member movably mounted on said lug by said pivot having one end engaged and moved by said finger member for operation of the arm of said shutter assembly when said panel is in open position, foldable into said camera body, and arranged so that said end thereof is moved toward the fulcrum of said finger member when said panel is closed.

CARL C. FUERST.